(No Model.)  6 Sheets—Sheet 1.
C. F. WALDO.
VELOCIPEDE.
No. 284,781.  Patented Sept. 11, 1883.
Fig. 2.
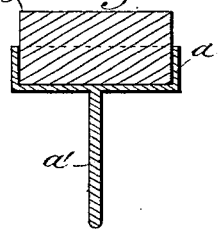
Fig. 5.
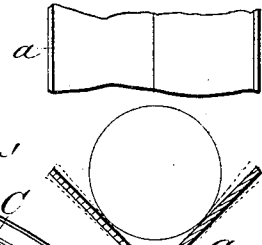
Fig. 3.
Fig. 4.
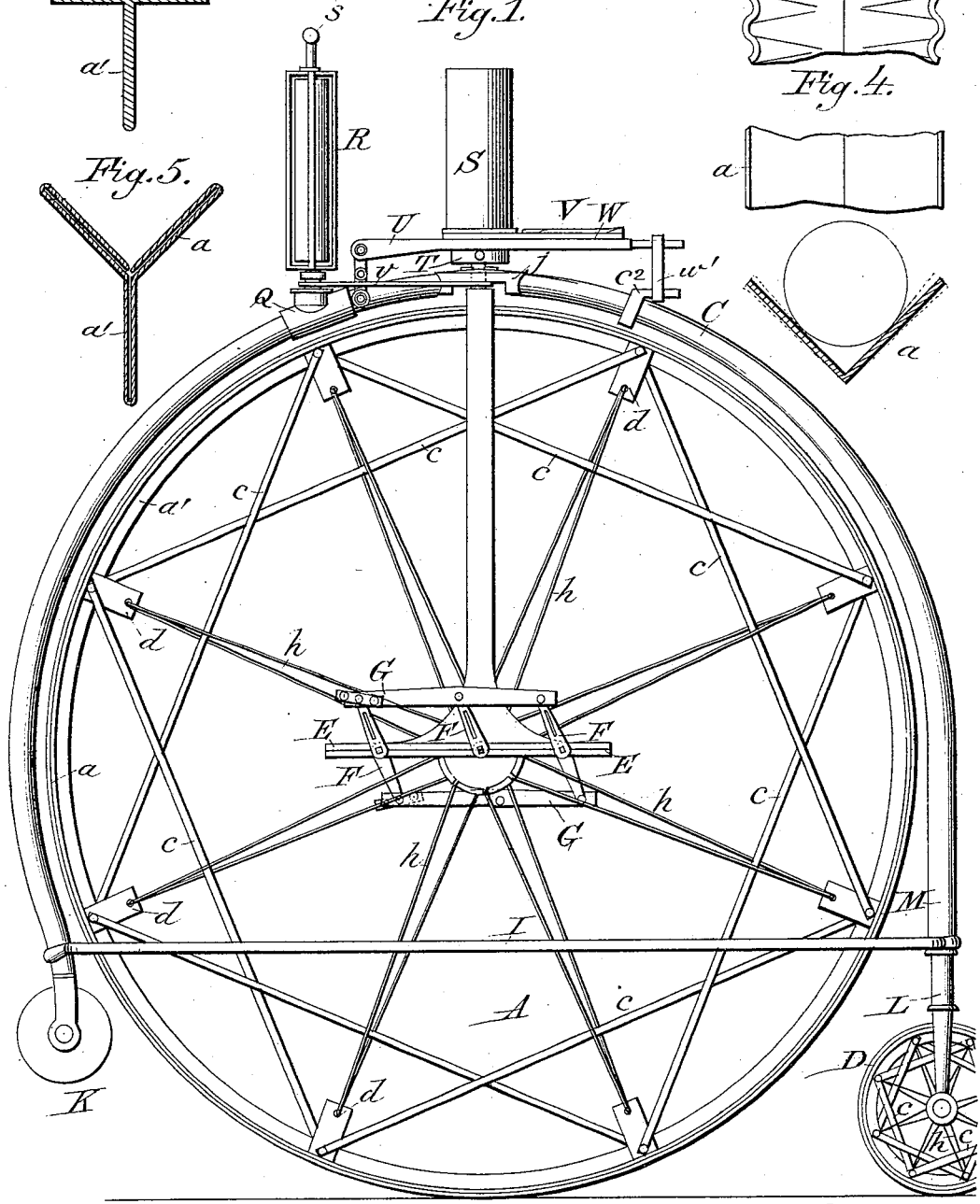
Fig. 1.
Attest:
J. H. Schott
J. L. Brauch
Inventor:
C. F. Waldo

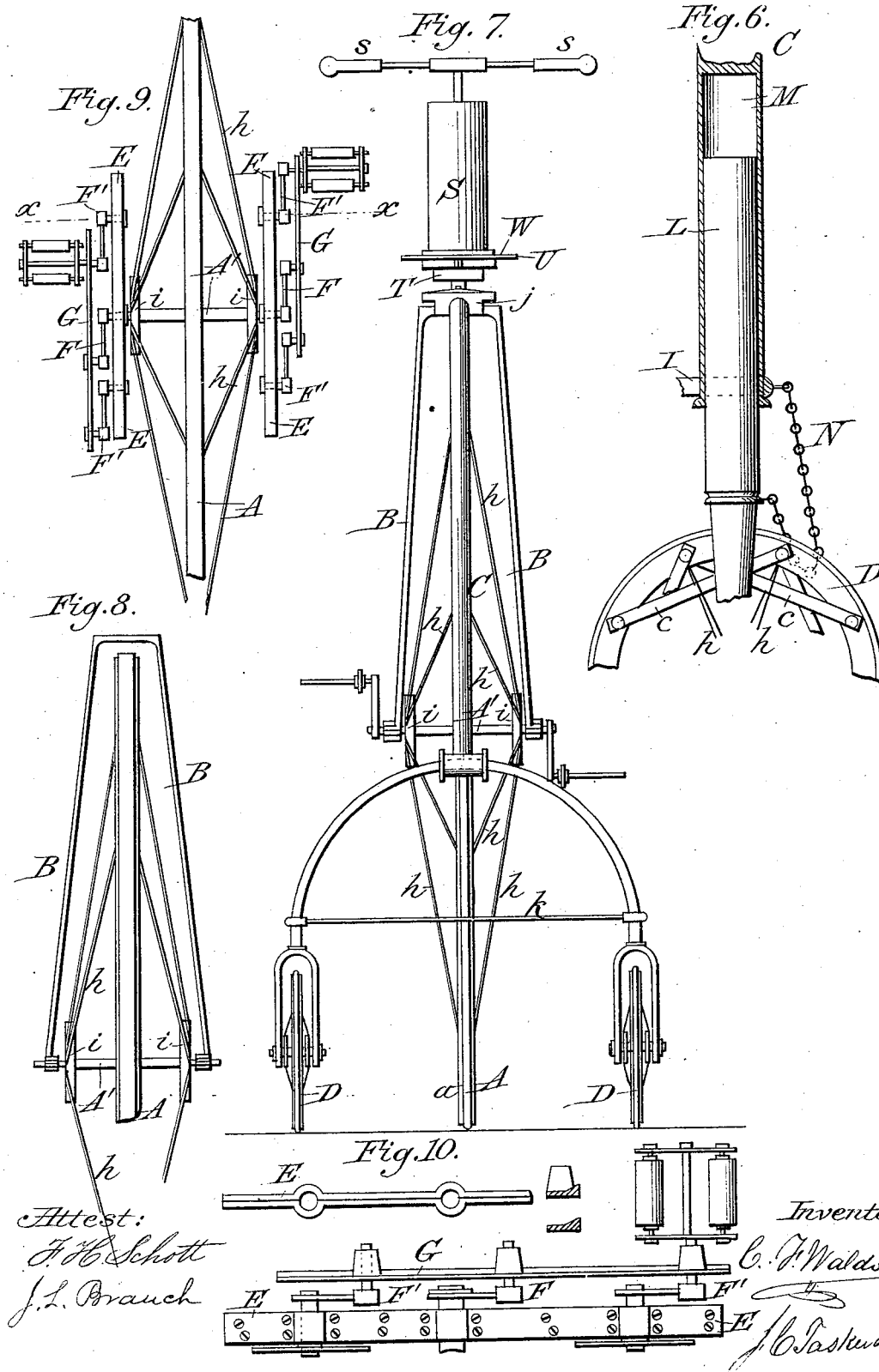

(No Model.) 6 Sheets—Sheet 3.
C. F. WALDO.
VELOCIPEDE.
No. 284,781. Patented Sept. 11, 1883.
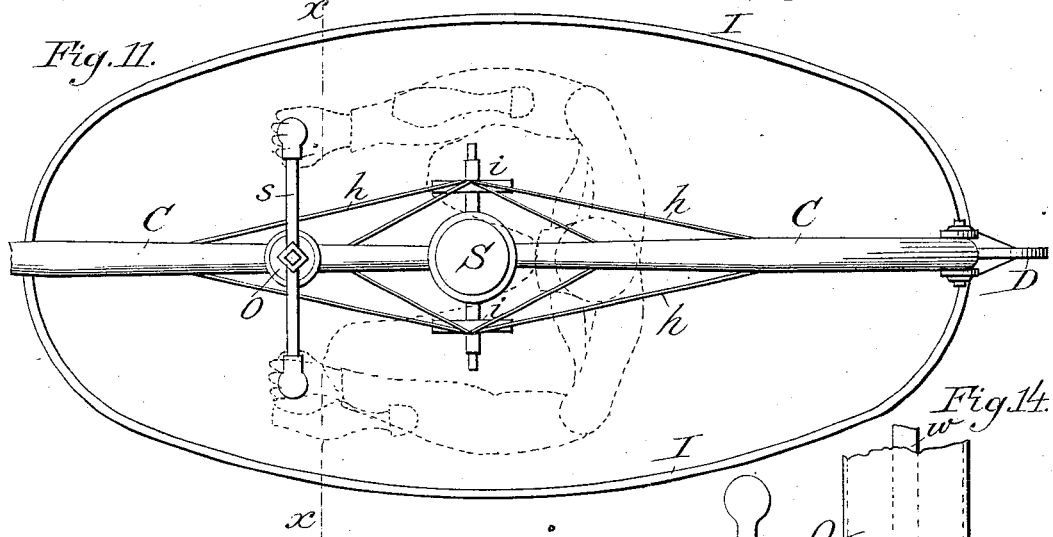
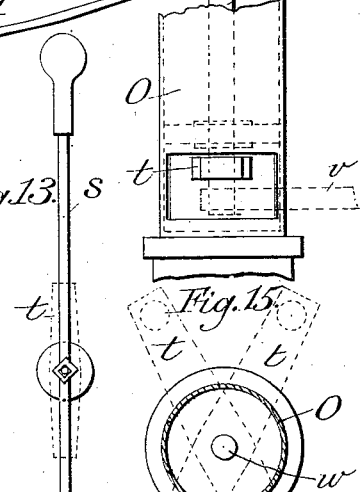
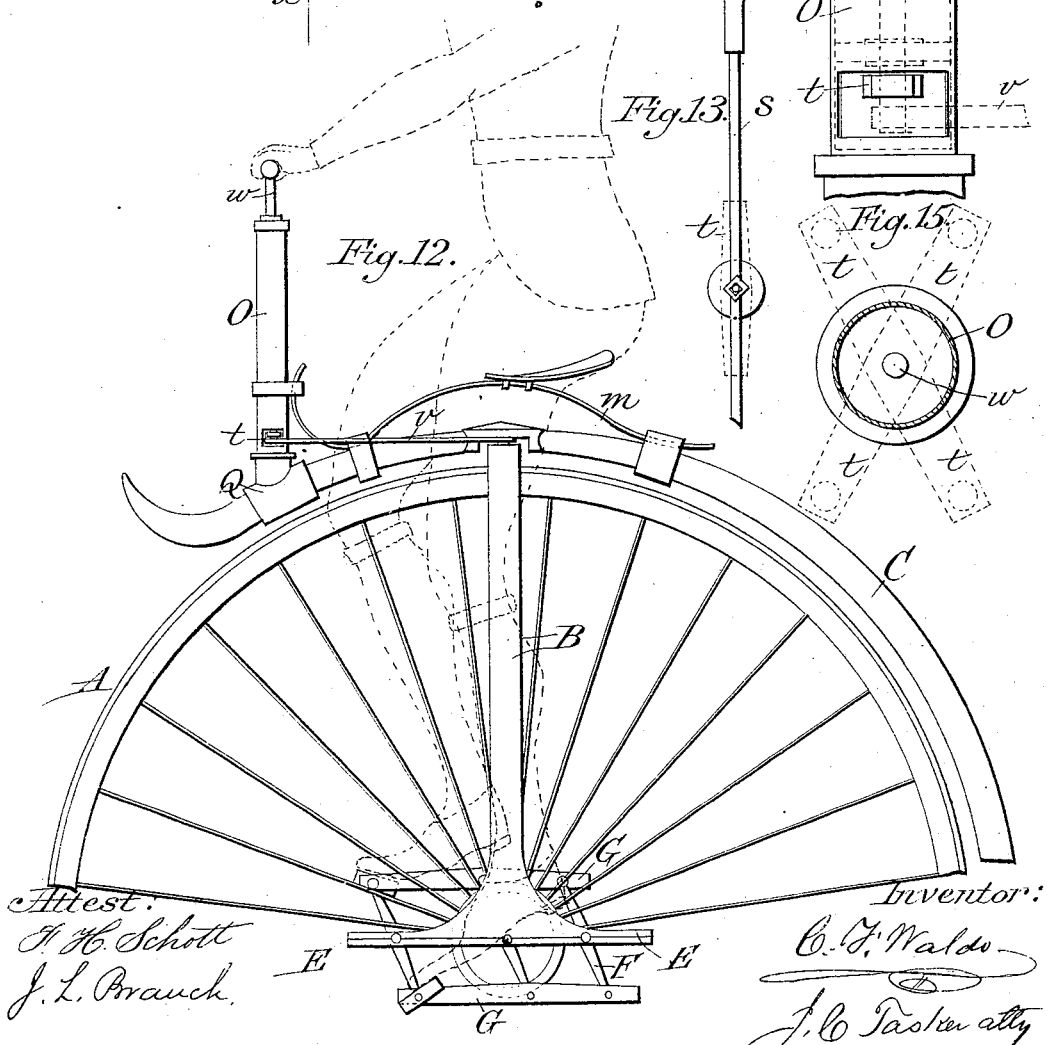
Attest:
J. H. Schott
J. L. Brauch
Inventor:
C. F. Waldo
J. C. Tasker atty

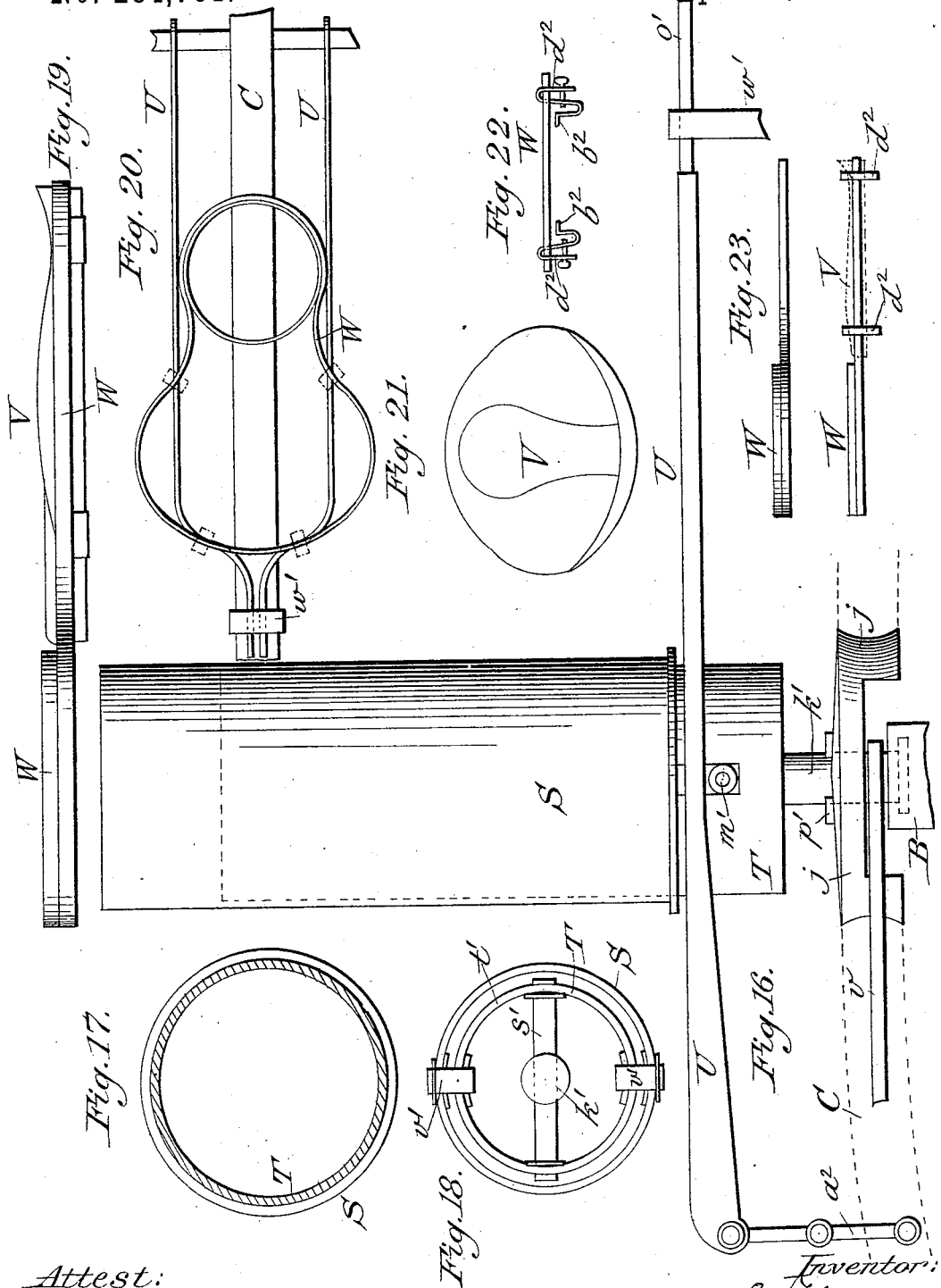

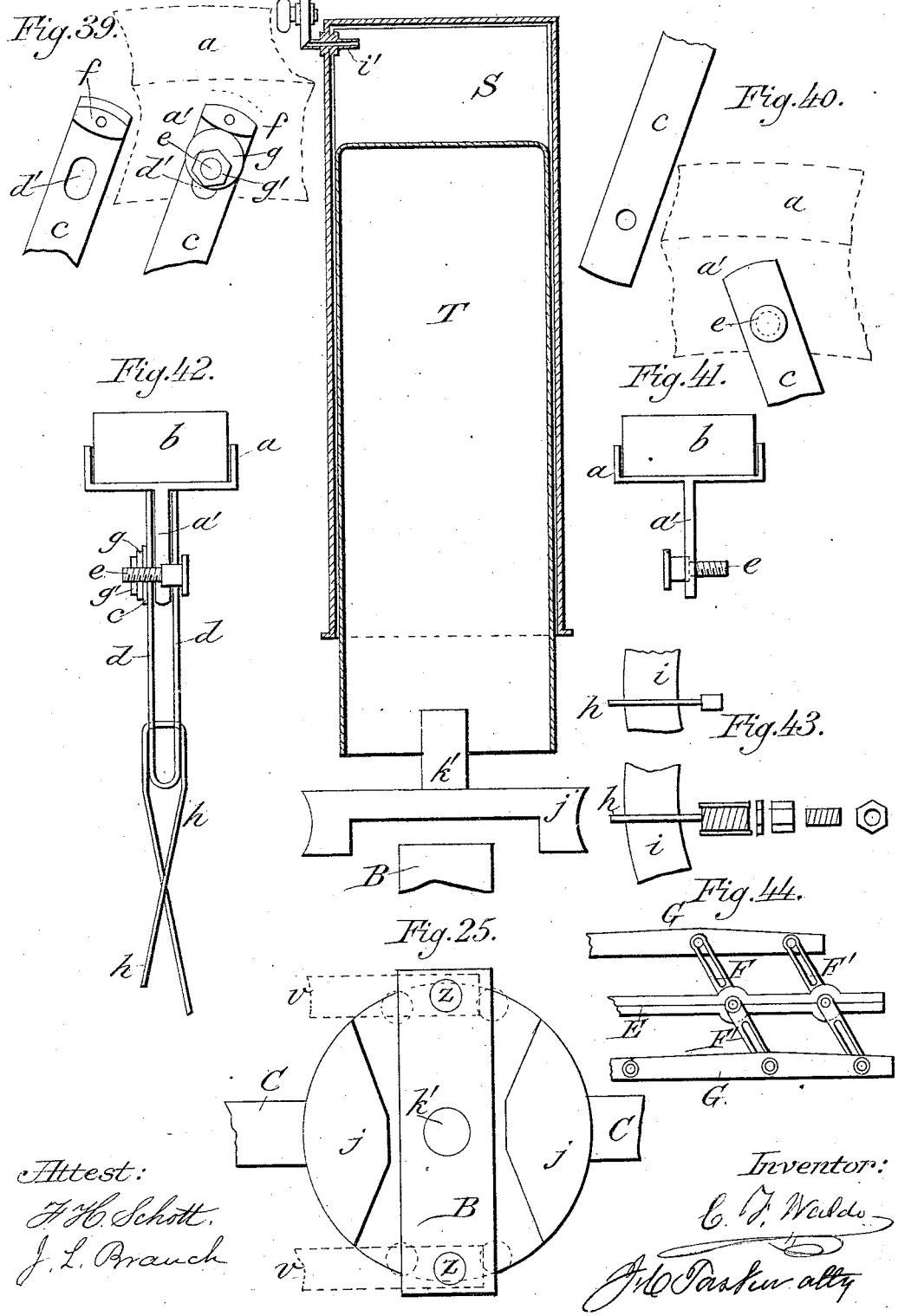

(No Model.)  6 Sheets—Sheet 6.
C. F. WALDO.
VELOCIPEDE.
No. 284,781.  Patented Sept. 11, 1883.
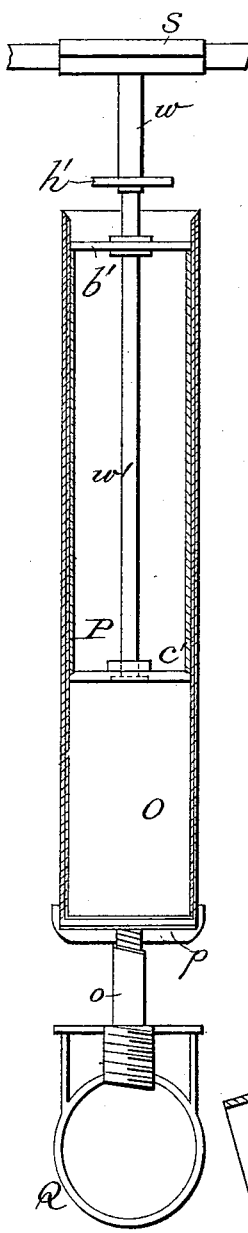
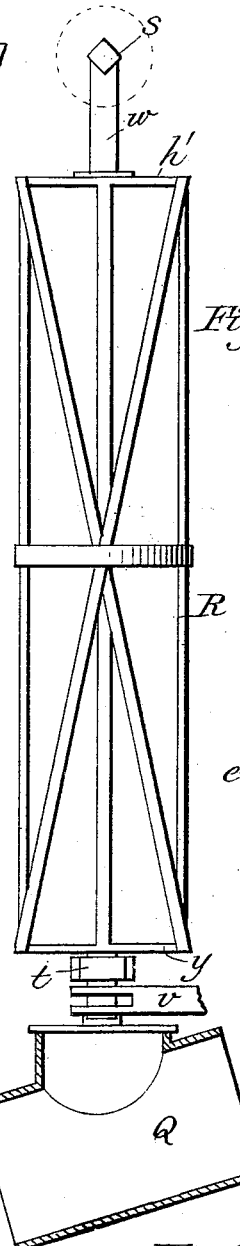
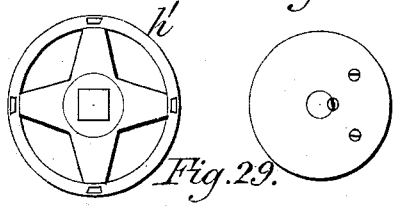
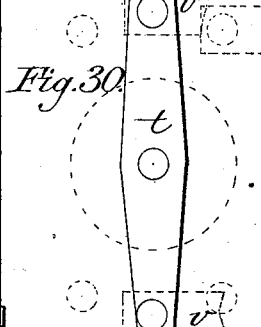
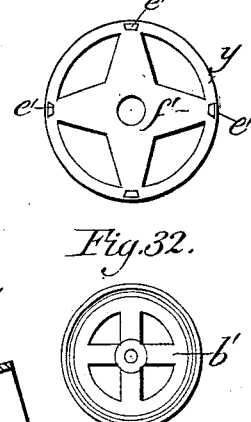
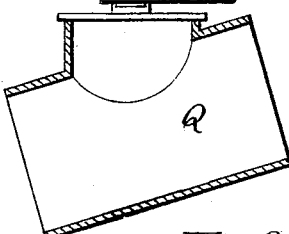
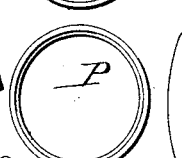
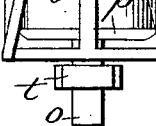
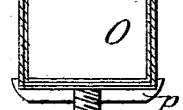
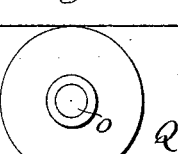
Attest:
F. H. Schott.
J. L. Brauch.
Inventor:
C. F. Waldo,
J. C. Fose Ker, atty.
N. PETERS, Photo-Lithographer, Washington, D. C.

UNITED STATES PATENT OFFICE.

CHARLES F. WALDO, OF NEW YORK, N. Y.

VELOCIPEDE.

SPECIFICATION forming part of Letters Patent No. 284,781, dated September 11, 1883.

Application filed October 3, 1882. (No model.)

*To all whom it may concern:*

Be it known that I, CHARLES F. WALDO, a citizen of the United States, residing at New York city, in the county of New York and State of New York, have invented certain new and useful Improvements in Velocipedes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates, first, to a new and useful improved construction of the "cycle-wheels," so called; second, to a novel construction, combination, and arrangement of the parts for actuating and operating the driving-wheel by which the vehicle is propelled; third, to a spring apparatus designed to prevent or modify the transmission to the rider through his body and limbs of the jar or chatter incident to the irregularities of the surfaces over which the vehicle is propelled; and, further, in certain details of construction, as hereinafter more fully described and claimed.

In the annexed drawings, Figure 1 represents a side elevation of my invention as applied to a bicycle. Fig. 2 is a cross-section of felly and flat rubber or gutta-percha tire. Figs. 3, 4, and 5 are detail modifications of tire and felly. Fig. 6 is an enlarged sectional detail of the perch air-spring apparatus. Fig. 7 is a rear elevation of my invention as applied to a tricycle. Fig. 8 is a rear elevation of the driving-wheel and the forked standard. Fig. 9 is a plan view of same with foot driving-gear. Fig. 10 represents details of the foot driving-gear. Fig. 11 is a top view of the bicycle shown in Fig. 1, showing in dotted lines the position of the rider. Fig. 12 is a side elevation of an ordinary bicycle provided with my improved foot driving-gear and hand-bar apparatus. Fig. 13 represents an enlarged top view of one-half of the hand-bar, its vertical working-shaft, and containing-frame, with the crank beneath shown in dotted lines. Fig. 14 is a detail view of the lower portion of the containing-frame, vertical shaft, and crank, with one of the connecting-rods in dotted lines. Fig. 15 is a top view of Fig. 14, showing the underneath working-crank in dotted lines at its two vibrations. Fig. 16 is a side elevation of the combined air-chamber and plunger, constituting the main air-spring. Fig. 17 is a horizontal section of the above-mentioned air-chamber. Fig. 18 is a plan representing the manner of supporting the plunger of the main air-spring. Fig. 19 is a side view of the saddle in its holding-frame. Fig. 20 is a plan of saddle and holding-frame. Fig. 21 is a plan of saddle. Fig. 22 is a view of the grip-stays by which the saddle is held in its frame. Fig. 23 represents side views of the saddle-frame. Fig. 24 is a vertical section of the main air-chamber and plunger, and shows their relation to the center cap of the backbone or perch. Fig. 25 is a bottom plan view of the perch center cap. Figs. 26 to 38, inclusive, are shown on one sheet, and represent in details the construction of a combined hand-bar and its air-spring apparatus. Figs. 39 and 40 represent views of one of the brace-bands of the driving-wheel. Fig. 41 is a view of tire and felly. Fig. 42 represents the manner of attaching the same to the radial wires of the driving-wheel. Fig. 43 illustrates the connection of the radial wires to the hubs of the driving-wheel, and Fig. 44 is a side view of the foot driving-gear.

Like letters of reference are used to designate the same parts in the several views.

Referring to the above-mentioned drawings, the letter A denotes the driving-wheel. B is the forked standard; C, the perch or backbone; and D designates the following wheel or wheels, arranged at the rear end of the perch, which will be modified in construction according to the requirements of a bicycle or a tricycle.

The driving-wheel A and the following wheel or wheels D, the latter being a miniature reproduction of the former, are so constructed as to combine perfect symmetry with the greatest possible degree of strength and lightness. This result is attained in the following-described manner: In Fig. 2 is shown in section the felly or circumferential holding-rim $a$ of the driving-wheel, with a section of the intended flat rubber or gutta-percha tire $b$ in position thereon. This felly is braced and divided into arcs of a circle by the brace bands or chords $c\ c$, that are attached to the web $a'$ of the felly in the manner shown in Fig. 42. Each brace-band $c$ (see Fig. 39) is provided near one end with an oval opening, $d'$, for the passage of a bolt, *e*, and carries yet nearer to its end a butt-piece, *f*. The opening *d'* is passed over the bolt end of the bolt *e*, which, as shown in Fig. 41, has been passed through the vertical web *a'* of the felly. In Figs. 39 and 41 is shown a flat circular eccentric-piece, *g*, bearing as a fixed part of itself the hexagon-shaped elevated grip-piece *g'*, which enables the eccentric to be turned on the bolt *e*, so as to bear against the butt-piece *f*, by means of a spanner applied to the part *g'* until the extreme possible thrust of the eccentric is attained. The effect of this thrust upon the butt-piece is to put the utmost attainable tension upon the brace-band which constitutes the sectional chord of that section of the driving-wheel rim, the two ends of whose bow the brace-band binds with the whole force of its tension. A succeeding hexagon lock-nut, with a grip-surface biting on the outer surface of the hexagon upper part of the eccentric, is by means of a hand-spanner turned tight upon the latter, and thus securely holds the whole firmly in position and retains the tension of the brace-band thus created. The other or opposite end of the brace-band *c* has a simple round hole, as seen in Fig. 40, through which hole the threaded end of the bolt seen in Fig. 41 has previously been passed.

Through each of the folded and doubled strips *d* is passed one of the doubled radial wires *h*, one end of which, after starting and raising from one end of the double hubs *i i*, Figs. 7, 8, 9, and 11, and passing through the doubled strip *d*, is there reversed in direction and passes downward to the other one of the double hubs, where, with adjustable tension, as shown in Fig. 43, it is firmly secured. The rigidity of the tension that can be put upon the segmental brace-bands *c c*, in combination with that which can be put upon the radial wires *h h*, enables these wheels to be made to combine the utmost possible strength with the lightness seen, for instance, in the "felly" or rim represented in section at Fig. 2, which degree of lightness in suitable strength would, without such amount of sustaining-tension, be impracticable. The entire wheel is by reason of said tension, when properly adjusted, in almost as unyielding a state of rigidity as if it were one flat plate of thick glass. The combined disposition and arrangement of the material of the brace-bands, the radial wires, and the wheel-rim are on the principle known in mechanics as that of the bow and chord," used in the construction of bridges, the limit of whose power of endurance of weight-burden is the breaking-strain of the tensile strength of the suspended chord. In this instance it is the tensile strength of the bands and wires in combination. Each pair of radial wires suspends the proportion of weight it carries from the center of the bow formed by the segment of the wheel-rim, which is spanned by the chord formed by that particular band, the rim-segment and the band thus constituting the combined bow and chord. It is obvious that the band must somewhere be parted transversely to the direction of its length before the bow can open or extend itself, and thus yield and let the weight fall; also, it is equally obvious that, so long as the T-cross vertical web of the bow is (as it were edgewise) firmly held by the chord in its position, the combined bow and chord will sustain a prodigious weight so long as neither of them "buckle." Only torsion of the parts could induce a buckle there, and against any such torsion the extreme tensile tension of the combined brace-band and radial wires tends to furnish a reliable preventive. The sole actual obstacle to the tendency of the bow under the weight to overcome the structural resistance of its arc shape and yield to its load is the resistance of the chord which spans it to the tensile strain thereon. The combination, extending entirely around the circumference of the wheel, of a series of repetitions of the like bow and chord represented at Fig. 1 produces the strongest wheel for its weight yet known for the like purposes. It is emphatically a "suspension" wheel, the entirety of the weight borne being sustained by the tensile strength of the bands and wires in the combination shown, which tensile strength only is brought into requisition. It is stronger for its weight than the long-used and hitherto favorite, the so-called "ariel" or "spider," wheel, exposes less resistance to side winds, and is less liable to buckle. The driving-wheel, when rotated by the foot-power applied, is propelled by the effect of the traction of its tire upon the road-surface traveled. I have seen very many races through a period of years run by the most famous bicycle-riders, and watched the behavior and operation of the cylindrical tires on the driving-wheels over the track of the widely-known "Lillie Bridge" course at London, and then and there discovered that, in fact, there was always more or less "slip" or lost motion of the driving-wheels with such tires, the fact being that such a tire only grips with a surface of little more than a knife-edge upon the roadway, and the slip was always proportioned to the degree of energy with which the rider operated the foot-crank treadles rotating the driving-wheel.

I believe that a flat tire (similar to that represented at Fig. 2) would, on sound mechanical principles, all other attending circumstances being equal in every instance where sufficient distance was traveled, gain something perceptible in the amount of surface traveled, over that obtained with a velocipede using on its driving-wheel a cylindrical tire. It is with this belief that I have adopted and propose using a flat instead of a cylindrical tire, and have given it prominence in my specification. I maintain that such a flat tire as described and illustrated herein would by reason of its greater grip upon the road-surface traveled, and consequent greater traction thereon, invariably, under like condition of rider and weight, accomplish a greater distance in the same time than the tire that is cylindrical.

A modification of my improved construction of wheel appears in Figs. 4, 5, and 7. It consists in making the flare of the rim-flanges of the ordinary driving-wheels of velocipedes—such as the spider or any others—instead of a V shape, as heretofore, of a true right-angle shape, so as to admit the application of suitably-prepared rollers thereto, and by such altered shape to more or less increase the strength and rigidity of the completed wheel when formed of the same. Another and second modification under this head consists in rolling with duly-prepared suitable rollers the metal of the said wheel-flanges, while hot, into corrugated edges, as shown in Fig. 3. This will prodigiously increase still further the strength and rigidity, so as to render the thus-completed wheel-rim almost, if not entirely, non-buckling. The same is seen represented in Fig. 4 in dotted lines. Yet another and third modification under the same head consists, in addition to the square-shaped rim-flanges mentioned, in making also a vertical web to such a so-flanged wheel-rim as represented at Fig. 5, and also in rolling the metal of steel or other preferable suitable material double, so as to make both the web and flanges into a wheel-rim consisting of doubled thin metal, again with the intention of increasing the stiffness and rigidity of the wheel as an entirety.

The mechanism for actuating the driving-wheel consists, mainly, of two screw-clamped pairs of crank-socket or bearing plates, E E, one on each side of the vehicle, three secondary cranks, F F F, on each side, which rotate on parallel center studs or shafts that are carried by the said socket or bearing plates E, and two triple-cranked levers, G G, in which are borne the bearings or sockets in which the heads of the cranks F rotate. These triple-cranked levers G G, by reason of the combined section of the cranks which carry them, have a constantly level combined parallel motion in unison with the combined rotation of the three secondary cranks F, which, in combination, actuate them. The foot-power is applied only to the forward secondary crank F, borne on the foremost end of each lever G, which crank by reason of the lever-connection compels the exact simultaneous rotation of all three of the cranks, the heads of which engage in and actuate the triple-cranked lever. These cranked levers by their arrangement have each of them their fulcrum at their rearmost crank-head, their applied power at their foremost one, and their resistance or load at their center one, thus constituting each a lever of the second order. This new method of applying the foot-power that actuates the driving-wheel has for its object to secure a largely-increased force at the axle-crank thereof, much greater than was possible for the unaided power that could be exerted by the foot of the rider, and far beyond that which any rider by the natural power of his foot alone could in any way apply to the crank of the front axle, or any axle of a velocipede. By this arrangement of parts, and the difference of distance between the foremost and center crank-heads and that between the center and rearmost ones, a leverage is furnished whereby the power exerted direct by the rider's limb or foot, compared with the secondary or leverage power applied by means of the intervention of the lever at the driving-wheel-axle crank-head, is as, say, nine to fourteen, so that if the rider's natural direct maximum force applied at the driving-wheel-axle crank-head should be equal to seventy pounds, the secondary or leverage force of his foot-power thus applied at the same crank-head by means of the intervention of the lever would be equivalent to about, say, one hundred and nine pounds at merely the distance-spaces represented in Figs. 1 and 41. With greater difference of distance between the crank-heads the increased leverage-power would at the same point be proportionately greater; but the above will be found to be practically a very important increase of power. The levers are constant and uniform throughout the "down-pushed" half of the revolution of their secondary cranks in the increased power exercised through their intervention, as mentioned. This increased foot-power, transmitted through the intervention of the triple-crank levers G, bears against the transverse strength of the foremost and central and against the tensile strength of the rearmost crank F constantly throughout the said half part of their coincident revolutions. With perfect workmanship and thorough lubrication the three cranks all move together as simultaneously as if one piece. The lever is operated only by the force of the secondary cranks, to the treadle of one of which secondary cranks alone the rider applies his foot. The lever's force, magnified by the leverage before mentioned, alone rotates the center crank, which crank alone rotates the shaft or axle of the driving-wheel, and said center crank, accompanied by the combined revolution of the other two secondary cranks, causes the driving-wheel at every combined revolution of all three of the cranks to effect a revolution of its entire circumference over or upon the roadway traveled. The rider by the easy distance from his shoulders of the hand-bar and its vertical shaft before him, combined with the rigidity of its base on the perch, works it with perfect comfort by his hands quite as easily, to say the least, and as efficiently, quickly, and sensitively, as by the now ancient arrangement of these parts directly at the junction of his legs, while the interposition of the hand-bar air-spring accompanying them averts from his hands and arms the terrific jar and tremor of the wheel-centers, which have heretofore afflicted and now afflict these members in riding the bicycles hitherto and at present in use.

The manner in which the rider applies his feet to the foremost secondary crank-treadles is seen represented in the dotted outline of him shown at Fig. 12, said foremost treadles, and his feet with them, rotating around the centers of the said foremost opposite secondary cranks, which centers of said opposite two cranks are in the same transverse line, and the said centers of said cranks are borne by the "socket" or bearing plates E, previously mentioned, which are affixed at the base of the forked standard. This mechanism can also be adapted and applied to divers other velocipedes, or to an ordinary bicycle, as heretore used. An instance appears in the representation shown at Fig. 12 of an application of portions of it to the existing long-used usual "spider-wheel" bicycle. There is further represented at Fig. 12 that portion of this invention which comprises the new arrangement consisting in the advanced position of the hand-bar, with its subsidiary vertical shank and double crank, and its firmly-attached working-base upon and to the foremost limb of the double or lengthened perch, as illustrated, without any accompanying air-spring, in said figure, by which it is seen that the new arrangement of the advanced hand-bar may be adapted and applied to such or similar vehicles, either with or without an accompanying air-spring.

In Fig. 8 is represented a rear elevation of only the driving-wheel A, axle A', the right and left hubs, $i$ $i$, the radial sustaining-wires $h$ $h$, showing their position and number in one half side of the driving-wheel, and the pair of forks composing the standard B, which carries the axle and foot-gear. A plan of the same parts, together with the pedal-gear, is shown in Fig. 9. In this latter view it will be seen that the center crank, F, is connected with the axle A', while the end cranks, F' F', are connected only to the bearing-plates E and triple-cranked levers G, the increased distance between the forward and center cranks, as compared with the distance between the center and rear cranks, being also shown in this view, as well as in the details shown in Fig. 10.

In Fig. 11 is introduced in dotted outline a top view of the rider in place on the velocipede, showing his relative position generally in respect to the vehicle while riding. The places occupied by his feet, which in the view are more or less covered by his arms, are represented in finer dotted lines. He is represented having his left leg and foot as pressing down the left treadle at the forward throw of that treadle, and the right leg and foot as withdrawing upward his foot from the right treadle at the rearward or "back" throw thereof. The technically so-called "tread" of the velocipede shown by this figure is radically different from that seen in ordinary velocipedes hitherto used, in that the right and left foot both rotate separated treadles having a line of center common to both, and represented by the dotted line $x$ $x$, shown also in Fig. 9, this line of common center, instead of being, as heretofore, at the center of the driving-wheel, being in this velocipede at a point considerably forward of that center. This circumstance, in connection with the new forward position of the hand-bar and its vertical shaft, is the cause of a position very different from that afforded by or practically obtainable with bicycles or velocipedes heretofore in use. It is claimed that this new position is more effective and graceful and at the same time easier and more advantageous than the old one.

Fig. 7 represents in rear view an elevation of a velocipede similar so far as relates to the construction of the wheels, the triple-crank driving-lever, the chief or saddle air-spring and its gear, and the hand-bar and its gear, (without an air-spring,) but differing in having, instead of one, two "following" or rear wheels, D, so applied as to constitute it a tricycle. It represents it with the treadle removed each from its carrying-shaft, which is shown left bare. In this position the three cranks of this triple-crank lever, being all in the same line, appear as one, only the thin-edged end of this lever being seen. A feature in this arrangement of velocipede is shown in the rear cross-stay bar, $k$, Fig. 7, which contributes to a certain degree of additional steadiness and rigidity in the vehicle, and at the same time that it affords place for a convenient step when mounting to the seat. From the ends of this cross-bar an equivalent rod to the leg-protector I (seen in Figs. 1 and 11) can, if desired, be run on either side of the rider around to a front limb of the perch or backbone. With a tricycle-velocipede of the description now mentioned, the rider will be relieved from the liability to topple, to overset or fall over, and from the necessity, as in a bicycle, of being a skilled rider; yet he will be competent, with the greater power and speed afforded by the foot driving arrangement of this machine, to as thoroughly realize the exercise and enjoyment of this sort of locomotion as if he were skilled in riding a bicycle.

Fig. 12 represents an ordinary construction of spider-wheel adapted to an application of certain portions of this invention—that is to say, the triple-crank lever for the purposes of the foot-power, the forward-placed position of the hand-bar, its vertical shank and actuating-crank, and the attachment of the same to the perch to operate the top of the pair of forks or standards, and in connection the forward seat of the rider, which is very nearly over the driving-wheel center, or more nearly so than heretofore. With those who can tolerate the jar or chatter of the saddle, and would dispense with the air-spring, hereinafter described, any usual or convenient spring, of which one arrangement appears at $m$ in this Fig. 12, may be applied to sustain the saddle of the rider, as shown.

The perch or backbone C, as represented in Fig. 1, consists of two limbs, the rearmost of which, together with whatever burden or weight it sustains, is wholly borne by the two wheel-centers—namely, that of the driving-wheel A and following-wheel D. This perch has its rear and foremost limbs substantially "brazed" to the center cap, $j$, which is shown in Figs. 1 and 7 immediately over the top of the standard B. The entire united double-limbed perch has always a constantly-unvarying direction of position throughout relative to that of the rider, while the direction of the main driving-wheel beneath may be varied by the action of the hand-bar at the will of the rider.

A leg guard or protector, I, consisting, preferably, of a light hollow metallic rod, is arranged to expand on each side from the rear end of the perch outside of and around the position occupied by the foot of the rider, as shown in Figs. 1 and 11, to the lower end of the front limb of the perch, and so on in like manner on the other side to the opposite or rear end of the perch, whence it started, thus forming an oval outline-guard that serves to protect the feet of the rider from exposure to collision with any person or object in the path of the velocipede. At the front end of the perch is a guard-roller, K, which affords an additional support to the perch in the event of the vehicle being thrown suddenly forward by coming in contact with any considerable irregularity in the surface over which it is propelled.

In order to relieve the body and limbs of the rider from the effects of jar and shatter incident to the passage of the vehicle over irregular surfaces, one or more air-springs are provided, as hereinafter explained. The rear-perch air-spring apparatus illustrated in Fig. 6 receives and absorbs the irregular jarrings of the following wheel or wheels D, so that the rider entirely or almost entirely escapes their effects. The plunger L of this air-spring is carried by the following-wheel D, and, according to its pressure, which is adjusted by an air-tap, and the weight it carries, plays up and down with the oscillations imparted to it in an air-chamber, M, formed in the rear end of the perch. A light check-chain, N, is made to attach the base of the plunger to the base of the perch, so that the former cannot fall entirely out of the containing air-chamber. The hand-bar air-spring apparatus, borne by the foremost limb of the perch C, receives and absorbs any jarring that may overpass from the rear-perch air-spring, and whatever surplus jar might pass beyond and not have been taken up by the center or main air-spring apparatus, and is designed to effectually protect the hands and arms of the rider from the greater part, if not from the whole, of their effects. The connection of the combined hand-bar and air-spring apparatus with the perch C is shown in Figs. 1, 11, and 12, while the details of its construction are illustrated in Figs. 13, 14, 15, and Figs. 26 to 38, inclusive. Fig. 26 represents the hand-bar air-spring with its air-chamber O and plunger P, its supporting-platform and stud, and the sustaining-shell Q, that carries the whole, which shell itself is borne by the perch or backbone. This shell is of cast-steel or any preferable suitable metal, and after being properly prepared is at the position indicated in Fig. 1 shrunk onto the perch or backbone. It is tapped to receive the hollow screw-standard and bolt $o$, on the top of which is chased a screw-thread, as shown, upon which screw is firmly screwed the platform-piece $p$, into which is set the base of the chamber O, and to the said platform-piece the said base is firmly attached by screws, as shown in Fig. 34, or by other suitable means. The plunger P, with its piston-rod, on which has previously been set the cap $h'$, Fig. 28, and next the bar-handle $s$, is then plunged into the chamber O, said plunger having a lubricated air-tight easy fit. The air previously in the chamber is by the inthrust, and according to the degree of force exerted by the hand of the rider, compressed into the reduced space of the diminished chamber, and the resistance of such compressed air constitutes the air-spring, which sustains with a certain peculiar and agreeable elasticity the pressure of the hand and arm of the rider.

Fig. 27 represents the plunger cage-frame R, the function and office of which is to conduct and carry over and around the air-chamber, with its plunger, and efficiently communicate to the double-armed crank $t$, the actuating motion imparted to the hand-bar by the hand of the rider.

Fig. 29 is a side view, and Fig. 30 a plan view on the like scale, of the doubled-armed crank $t$, one end of which by its reciprocation actuates one of the connecting-rods $v$, which is attached at its other end to one of the pivots by which the vibratory throw of the top of the pair of forks or standards which carry the driving-wheel is operated. The lower or spindle portion, $w'$, of the hand-bar vertical shank or rod $w$ rotates easily in its bearings in the open stay-plate $b'$ (seen in place in the plunger in Fig. 20) at the upper part, and in the socket-plate $c'$ at the lower part, of the plunger shown in Fig. 26. The upper portion, $w$, or hand-bar vertical shank proper, Fig. 26, is made square where it passes through the cap $h'$, Fig. 28, so that thereby the turning of said vertical shank or shaft is fully imparted to the cage-frame, and the crank $t$, beneath the same, attached thereto, and without disturbance of the function of the air-spring chamber and plunger the crank is, in accord with the action of the hand-bar, freely vibrated and caused to carry with it in its vibrations the connecting-rod $v$, attached to the pivot-studs of the top of the pair of standards before mentioned, and to thereby cause the pair of standards, together with the axle of the driving-wheel which they carry, correspondingly with the motion given by the driver's hand to the hand-bar, to change their position, and consequently the direction of the velocipede, at the will of the rider.

Fig. 31 represents a plan view of the base-piece $y$ of the plunger cage-frame shown at Fig. 27. This base-piece receives in four bevel apertures, $e'$, in its rim, at the ends of the star-like plate $f'$, the beveled lower ends of the corresponding uprights of the cage-frame, which ends are therein further secured by suitable screws. The like arrangement is made with the upper ends of the uprights at the cap $h'$, Fig. 28, so that by means of the bevel apertures and the screws combined the uprights are securely held in place, and the cage, as a whole, retains suitable rigidity to respond to and fulfill the working requirements of the plunger-bar shaft or shank, when actuated by the hand of the rider, as well as those of the crank $t$, Fig. 30.

Fig. 33 represents a top and upper side view of the plunger barrel or cylinder, the inner edge being made flaring for the easy reception of the lubricated piston when thrust into it by means of the piston-rod. The parts are put together as follows: The plunger and platform $p$, being previously dismounted and removed, the cage-frame R, with its firmly-attached crank $t$, is then next passed over the shell base-stud $o$, said stud being passed through the center of the crank $t$, also the center of the base-piece of the cage-frame. The cage-frame, with its under-borne crank $t$, is then freely resting upon the base-stud in the position seen in Fig. 37, and while in that position the plunger, with its sub-attached platform $p$, as seen at Fig. 36, is lowered within the cage-frame and firmly screwed onto the base-stud $o$, so that the whole collectively are in the relative positions represented in Fig. 35. The cap is then restored to its place at the top of the cage-frame, and the entire apparatus appears in a combined form, as represented in Figs. 1 and 12.

Figs. 13, 14, and 15 represent, collectively, an enlarged view of one-half of the hand-bar $s$, with its vertical working-shaft and containing-frame, the position of the crank-shaft $t'$ at its two vibrations being represented in dotted lines in Fig. 15.

The center or main air-spring apparatus, the position of which is shown in Figs. 1 and 7, is fully illustrated, in connection with the seat or saddle frame, in Figs. 16 to 25, inclusive.

Fig. 24 represents in section the air-spring chamber S and plunger T, and the method by which they are attached to the center cap, $j$, of the backbone or perch, and retained in their working position. The plunger T fits with an easy lubricated fit, which is air-tight, into the chamber S, and when by the entering in of the plunger T the air in the chamber is compressed into the diminished space contained between the upper end of the plunger and the end of the chamber, as shown, it constitutes by its compression an elastic spring of sufficient force to sustain the weight of a substantial man with more or less yielding resistance, affording easy and pleasant oscillation. An air-tap, $i'$, with an airway of a bristle's capacity, can be turned on or off, so as within limits to bring the amount of the force of the spring's resistance to the rider's weight to just the amount desired. The center cap of the perch, which cap $j$ underlies the plunger, is seen in side view in Fig. 24, and beneath this center plays in vibrations the top of the forks or standards B, and through said top, also through said center cap, passes the bolt $k'$, around which bolt as a center the top of the forks or standards vibrates in its partial turning, which turning is effected by the hand-bar $s$, actuated by the hands of the rider in effecting any change of direction followed by the velocipede.

Fig. 25 represents the lower half of the perch center cap, $j$, with the top half of said cap removed, thereby uncovering and showing the top of the standards or forks, by the vibration of which top to the extent or less of the dotted circular spaces shown the driving-wheel shaft or axle carried by the said pair of standards or forks is, according to the extent of the vibration, changed in its position, and consequently the direction taken by the velocipede. At letter $z$ is shown the place of the studs or bolts in the said top, to each of which studs is attached one end of each of the connecting-rods shown in dotted lines at $v$, which connecting-rods are actuated by the crank $t$ when worked by the hand-bar.

Fig. 16 represents an external side view of the combined air-chamber and plunger, constituting the main air-spring, which, in combination, form a yielding spring that enables the chamber, by means of the devices shown, to support the rider in his saddle or seat. This figure also represents a sustaining and operating compound lever, U, by the force of which, bearing upon the holes $m'$, one on each side, either by hand force applied to the handle $o'$ of said lever or by that of the weight of the rider upon the saddle, which weight is more or less conjointly borne both by the air-chamber and by said lever, the said air-chamber is held down upon the plunger and is maintained in place against the resisting force of the compressed air contained in the chamber. This force furnishes a more or less yielding spring, which, with an agreeable elasticity, sustains the rider in his seat and is interposed by its position between the jar or chatter of the driving-wheel center and the body of the rider. The plunger T, besides the hold upon it maintained by the air-chamber S, the saddle V, and the lever U, is also further held to the center cap, $j$, and to the top of the standards B by an attachment analogous to that of the gimbals of a compass by means of the vertical bolt $k'$, which bolt enters from the under side of the top of the standards, beneath which its head is placed and passes up through the center cap, above which last it is retained by a stay-pin, $p'$. The manner of attaching the plunger barrel or cylinder to the gimbals, and these last to the said bolt, is represented in plan view at Fig. 18, in which $k'$ represents the said bolt, through which is passed a transverse bolt, s', which passes, as shown, through an easy bearing-hole in an inner rim, t', through which inner rim are passed, at right angles to the first, two other bolts, v' v', which engage in easy bearings in the lower part of the rim of the plunger itself, which thus has in whatever direction an easy, universal, though steady, swinging or riding position, similar to that of a compass on its gimbals. A powerful elastic band, w', is thrown over the handle o' of the compound lever U, and over a finger, c², attached to the perch or backbone, as shown in Fig. 1, the purpose of which band is to aid in retaining constantly in position the lever U, which retains the air-spring in its place, so that upon the rider quitting his seat, or again upon his vaulting into it, the place of the lever, and consequently that of the saddle, is not greatly disturbed. The forward ends of the levers U U are connected to a transverse bar or bolt on the perch by means of double or jointed links a² a², which are so hinged in the center as to allow for oscillations of the air-spring and the saddle with the levers, so that in actual riding the saddle has an easy elastic motion, and the levers U, on account of their length, a more considerable one, gracefully rising and falling proportionately to and with the motion of the saddle.

Figs. 19 to 23, inclusive, show detail views of the saddle V and its frame W, the position of which, with relation to the levers U and main air-spring apparatus, is shown in Fig. 1. The saddle-holding frame is preferably made of steel or other suitable material in the form shown in Fig. 20, while the saddle itself, which is preferably made in a padded leather-seat form, adapted to fit into the larger portion of said frame, is shown in Fig. 21, the saddle, when in place, being arranged to rest on the supports b² of the holding cross-grip stays d². The rider sits with the main air-spring cylinder between his legs, the location of the saddle affording an easy position for so doing, placing his feet upon the pedals, and with them working the secondary or lever treadles, which rotate upon the forward ends of the crank-levers.

Having thus described my invention, what I claim as new, and desire to secure by Letters Patent, is—

1. In a driving-wheel for velocipedes and similar vehicles, the combination of the felly a, having web a', the brace-bands c c, axle A', having double hubs i i, doubled radial wires h h, doubled scuring-strips d d, and means for adjusting the tension of the brace-bands and radial wires, substantially as described.

2. In a driving-wheel for velocipedes and similar vehicles, the combination of the felly a, having web a', the doubled strips d d, radial wires h h, brace-bands c c, eccentric g, having grip-piece g', the butt-piece f, and the bolt e, substantially as described.

3. In combination with the driving-wheel of a velocipede, the bearing-plates E E, cranks F F F, and triple-cranked levers G G, substantially as described.

4. In a velocipede, the combination, with the wheel A, axle A', and forked standard B, having triple-socketed bearing-plates E E, of the secondary cranks F F F and triple-cranked levers G G, substantially as described.

5. In a velocipede, the combination, with the wheel A, forked standard B, and hand-bar shaft w, of the double-armed crank t and connecting-rods v v, substantially as described.

6. In a velocipede, the combination of the perch C, levers U U, connections a², c², and w', a main air-spring apparatus composed, essentially, of the air chamber or cylinder S and plunger T, means for connecting said plunger and perch, and means for holding the cylinder in position independent of the levers, substantially as described.

7. In a velocipede, a wheel felly or rim having its flanges a a and web a' composed of one piece of doubled metal, substantially as described.

8. In a velocipede, the combination of the perch C, having an air-chamber, M, in its rear limb, the following-wheel D, carrying a plunger, L, fitting said air-chamber, and the check-chain N, connecting the base of the plunger to the base of the perch, substantially as described.

9. In a velocipede, the combination of the perch C, the shell Q, having a screw bolt or stud, o, the platform-piece p, air-chamber O, plunger P, cage R, and hand-bar s, substantially as described.

10. In a velocipede, the combination of the wheels A D, forked standard B, the perch C, having a shell, Q, carrying a stud, o, and platform-piece p, the air-chamber O, plunger P, having plates b' c', the cage R, having cap h' and base y, the hand-bar s, having a vertical rod or shank, w, the double-armed crank t, and connecting-rods v v, substantially as described.

11. In a velocipede, the combination of the perch C, air-chamber S, plunger T, having an inner rim, t, the center cap, j, backbone B, vertical bolt k', transverse bolt s', and bolts v' v', whereby the plunger is supported in an easy swinging position, substantially as described.

12. In a velocipede, the combination of the perch C, backbone B, center cap, j, bolt k', stay-pin p', plunger T, air-chamber S, holes m' m', levers U, saddle-frame W, and saddle V, substantially as described.

13. A wheel composed of a felly having a web, a', and adapted to support a suitable tire, the brace-bands c c, doubled strips d d, radial wires h h, and suitable hubs, substantially as described.

In testimony whereof I affix my signature in presence of two witnesses.

CHARLES F. WALDO.

Witnesses:
OLIVER E. BRANCH,
FRANK RUDD.